United States Patent
Kight

[19]

[11] Patent Number: 5,978,113
[45] Date of Patent: Nov. 2, 1999

[54] APPARATUS FOR REMOTE LOOPBACK TESTING AND ISOLATION OF LOSS OF SIGNAL FAILURES WITHIN SYNCHRONOUS OPTICAL NETWORKS

[76] Inventor: William Dorsey Kight, 3045 Patuxent Overlook Ct., Ellicot City, Md. 21042

[21] Appl. No.: 08/920,636

[22] Filed: Aug. 29, 1997

[51] Int. Cl.⁶ .................................................. H04B 10/08
[52] U.S. Cl. .......................... 359/110; 359/166; 370/907
[58] Field of Search ................................... 359/110, 123, 359/139, 166; 370/907

[56] References Cited

U.S. PATENT DOCUMENTS

| 5,623,357 | 4/1997 | Kight et al. | 370/907 |
| 5,872,780 | 2/1999 | Demiray et al. | 370/907 |

*Primary Examiner*—Kinife-Michael Negash

[57] ABSTRACT

The Remote SONET/SDH Loopback (RSL) is an optical network interface device consisting of a facility interface 24, a drop side interface 26, a facility receive signal splitter 12, a drop side receive signal splitter 18, an idle signal generator 16, a command logic assembly 10, and a switching circuit assembly 22. The RSL addresses the need for a low-cost sub-section layer device by efficiently processing the SONET signal to support only loopback and idle signal generation. The RSL may be provisioned to either loopback the facility or generate an idle signal when the drop side of the termination is disconnected, turned-off, or has otherwise failed to generate a valid signal. The SONET signal may also be looped back upon itself when a user controlled loopback command code is detected within the SONET overhead. The RSL otherwise passes the SONET signal unaltered. The RSL may be provisioned by the user to specify the location and characteristics of the embedded loopback command codes.

3 Claims, 3 Drawing Sheets

APPARATUS FOR REMOTE LOOPBACK TESTING AND ISOLATION OF LOSS OF SIGNAL FAILURES WITHIN SYNCHRONOUS OPTICAL NETWORKS

BACKGROUND—FIELD OF INVENTION

This invention relates to synchronous fiber optic telecommunication networks, specifically to the intelligent termination and remote diagnostic testing of said synchronous fiber optic telecommunication networks at demarcation interfaces between public and private network entities.

BACKGROUND—DESCRIPTION OF PRIOR ART

The Synchronous Optical Network (SONET) standards were developed by the U.S. telecommunications industry to overcome the limitations of proprietary asynchronous schemes. As such, SONET standards define an open network architecture that allows multi-vendor interoperability. SONET standards have also been adopted by the European community as the Synchronous Digital Hierarchy (SDH).

An essential element of the SONET standard signal structure is the division of the network into hierarchical layers known as the Section, Line and Path layers. Each of the SONET layers have a very well defined set of functions that are required of SONET network elements to support performance monitoring, alarm surveillance, protection switching, and data communications. In accordance with the SONET standards, the minimum functionality required of any network element is that provided by the Section Layer.

The Section, Line, and Path hierarchy of the SONET network was refined in a prior application by this author (U.S. Pat. No. 5,355,238, issued to Kight, et. al.) in which the need to provide a secure demarcation point, not recognized by the SONET standards, was identified. The SONET standards committees have also recognized the need to address demarcation issues with respect to performance monitoring by introducing the Tandem Layer. Furthermore, specifications have now been developed for the Network-Network Interface (NNI) and the User-Network Interface (UNI) to define the desired characteristics of carrier-to-carrier and carrier-to-customer interfaces respectively.

A demarcation issue that remains to be addressed however is that of non-critical, non-secure, or inactive circuits. Presently, such circuits are terminated in little more than a fiber optic patch panel. Although automated testing and intelligent termination of the fiber circuit is desirable, SONET service providers are typically unable to economically justify the expense of a fully SONET compliant network element on these types of circuits. The hardware and software intelligence required to support the minimal requirements of the SONET Section layer are too expensive.

I saw the need for a unique and very low cost sub-Section Layer device that can be used to intelligently terminate and diagnose faults within SONET network segments without subverting the requirements of the Section Layer. I further saw a need for efficiently isolating a SONET service provider from troublesome loss-of-signal alarms due to equipment or fiber failures on the drop side of the demarcation point.

My invention, which I refer to as a Remote SONET/SDH Loopback (RSL), directly addresses this need by efficiently processing the SONET signal to support only loopback testing and idle signal generation. The RSL may be provisioned to either loopback the SONET facility or generate an idle signal when the drop side of the termination is disconnected, turned-off, or has otherwise failed to generate a valid signal. The SONET signal may also be looped back upon itself when a user controlled loopback command code is detected within the SONET signal overhead. The RSL otherwise passes the SONET signal unaltered.

I was unable to locate any prior art that relates to this specific application. I believe the lack of prior art to be related to the novel and unobvious nature of this device which runs counter to the requirements of the SONET standards. Most notably:

(a) the RSL does not terminate the SONET Section layer and does not alter the SONET signal under normal conditions while maintaining the ability to respond to embedded commands, (b) the RSL generates an idle signal in lieu of an Alarm Indication Signal (AIS) when a loss of signal is detected on the drop side of the device.

The generation of the idle signal is significant in that it allows the SONET service provider to distinguish between internal and external failures of the network without having to position a fully compliant SONET Section terminating device at the demarcation point. The RSL protects the SONET service provider from having to dispatch a technician to diagnose a possible out-side plant cable fault when the customer has accidentally turned his equipment off or suffered some other such failure.

The RSL idle signal may also be provisioned to include a unique location identifier in the Path Trace message so that if more than one RSL is used in a series, the SONET service provider can readily determine where in the series the failure was detected.

The passive nature of the RSL is also significant in that it significantly reduces the complexity, and hence the cost, of the device. The RSL uses a simple logic design to monitor a user specified location in the SONET signal overhead for the presence of an embedded loopback command code or string. The loopback command function is one-way and does not require a return channel.

The use of loopback devices on communication signals controlled by one-way command codes embedded in the signal itself is not new. Conventional Modems have long had the ability to look for escape sequences from which various diagnostic and loopback modes made be activated. I believe however that the use of this technique on SONET signals has been overlooked because of the industry's reliance upon the conventional management channels as defined by the SONET standards.

OBJECTS AND ADVANTAGES

Accordingly, several objects and advantages of the present invention are:

(a) To provide an intelligent remotely controlled diagnostic loopback capability without introducing another Section Terminating network element;

(b) To provide an intelligent fault isolation point between a network service provider and a customer premise without introducing another Section Terminating network element;

(d) To eliminate the generation of loss-of-signal alarms due to network failures beyond the demarcation point;

(e) To provide visual indications of the status of the SONET fiber optic interface;

(f) To provide either an optical-only interface or an optical/electrical interface supporting mixed mode optics;

(g) To eliminate the need for costly high-powered optical interfaces in customer premise equipment in the Optical/Electrical version of the Remote SONET/SDH Loopback which may be configured with long-range optics on the facility side;

(h) To provide a simple one-way control mechanism via the SONET transport or path overhead;

(i) To provide the SONET service provider a means to accommodate a variety of command and control options; and (j) To provide transparent operation under normal conditions.

Further objects and advantages will become apparent from the ensuing description and drawings.

DRAWING FIGURES

Figure 1:
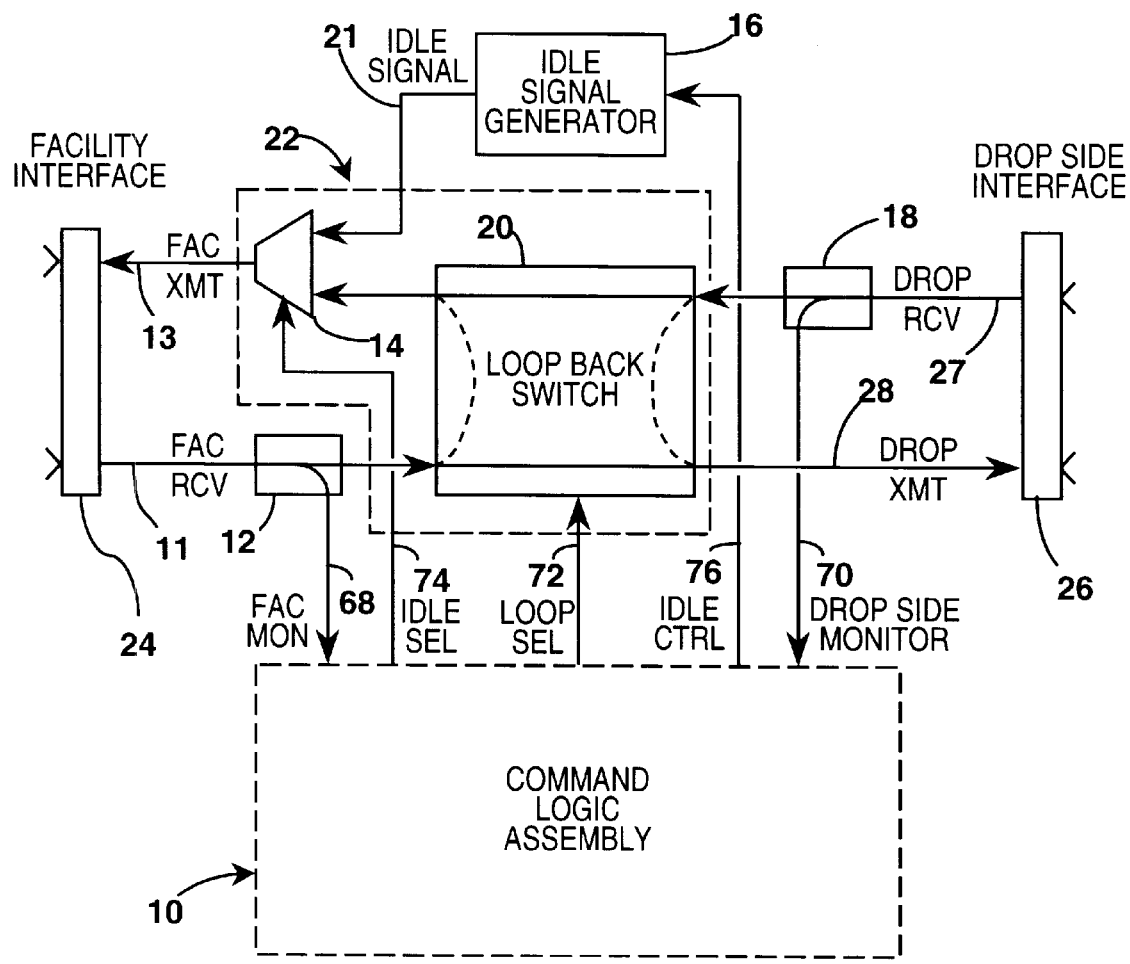
FIG. 1 shows a block diagram of the Remote SONET/SDH Loopback.

| Reference Numerals In Drawings | |
|---|---|
| 10 Command Logic Assembly | 11 Facility Receive Signal |
| 12 Facility Receive Signal Splitter | 13 Facility Transmit Signal |
| 14 Idle Signal Select Switch | 16 Idle Signal Generator |
| 18 Drop Side Receive Signal Splitter | 20 Loop Back Switch |
| 21 Idle Signal | 22 Switching Circuit Assembly |
| 24 Facility Interface | 26 Drop Side Interface |
| 27 Drop Side Receive Signal | 28 Drop Side Transmit Signal |
| 30 Provisioning Interface | 36 High Speed Clock |
| 38 Bit Serial Data | 40 Clock Recovery |
| 41 Byte Parallel Frame Data | 42 Framer |
| 43 Low Speed Clock & Sync | 44 Frame Address Generator |
| 45 Absolute Frame Address Data | 46 Payload Address Generator |
| 47 Payload Relative Address Data | 48 LUT Address Generator |
| 49 LUT Address Data | 50 NVRAM |
| 51 Microcontroller Data Bus | 52 Address Selector |
| 53 LUT Write Strobe | 54 Address Decoder |
| 55 Byte Parallel Drop Data | 56 Microcontroller |
| 57 Command Detect Signals | 58 RAM Look-up Table |
| 59 Read Strobe | 60 Drop Buffer |
| 61 Drop Strobe | 62 Correlator |
| 63 Correlator Write Strobe | 64 LOS Detector |
| 65 LOS Signal | 66 Read Register |
| 67 Frame Error Signal | 68 Facility Monitor Signal |
| 69 RAM Write Strobe | 70 Drop Side Monitor Signal |
| 71 Address Select Strobe | 72 Loop Select Signal |
| 74 Idle Select Signal | 76 Idle Control Signal |
| 78 Provisional Data Signal | 80 LED Display |

DESCRIPTION—FIGS. 1 TO 3

A signal diagram of the invention, hereinafter referred to as a Remote SONET/SDH Loopback, is illustrated in FIG. 1. The Remote SONET/SDH Loopback is an optical network interface device consisting of a facility interface 24, a drop side interface 26, a facility receive signal splitter 12, a drop side receive signal splitter 18, an idle signal generator 16, a command logic assembly 10, and a switching circuit assembly 22.

Switching circuit assembly 22 comprises an idle signal select switch 14 and a loop back switch 20. Command logic assembly 10 is described following the discussion of FIG. 1.

During normal operation a facility receive signal 11 from facility interface 24 passes through facility receive signal splitter 12 and through loop back switch 20 whereupon said facility receive signal 11 is connected to drop side interface 26 via a drop side transmit signal 28. In the opposite direction, a drop side receive signal 27 from drop side interface 26 passes through drop side receive signal splitter 18, loop back switch 20 and idle signal select switch 14 whereupon said drop side receive signal 27 is connected to facility interface 24 via a facility transmit signal 13.

A facility monitor signal 68 is generated by facility receive signal splitter 12 and is connected to command logic assembly 10. In similar fashion, a drop side monitor signal 70 is generated by drop side receive signal splitter 18 and is connected to command logic assembly 10.

Command logic assembly 10 processes facility monitor signal 68 to detect loopback command codes embedded within facility receive signal 11. There are three possible command codes corresponding to an on-state, an off-state, and a timer-state.

If the on-state command code is detected, command logic assembly 10 will assert a loop select signal 72 connected to loop back switch 20. Facility receive signal 11 will be connected to facility transmit signal 13 via loopback switch 20 and idle select switch 14; drop side receive signal 27 will be connected to drop side transmit signal 28 via loopback switch 20.

If the off-state command code is detected, command logic assembly 10 will clear loop select signal 72 and operation will return to normal.

If the timer-state command code is detected, command logic assembly 10 will enter the on-state as described above for a fixed interval of time. Upon expiration of the timed interval, command logic assembly 10 will return to the off-state and operation will return to normal. If the timer-state command code is detected while command logic assembly 10 is in the timer-state, the state timer is reset and the interval begins again.

Command logic assembly 10 processes drop side monitor signal 70 to determine if a loss-of-signal (LOS) condition exists at drop side interface 26. If a drop side LOS is detected command logic assembly 10 will assert an idle select signal 74 connected to idle signal select switch 14 whereupon an idle signal 21 from idle signal generator 16 is connected to facility transmit signal 13.

Facility interface 24, drop side interface 26, facility splitter 12, drop side splitter 18, and switching assembly 22 may be implemented using either passive optical components or active optical/electrical components.

Figure 2:
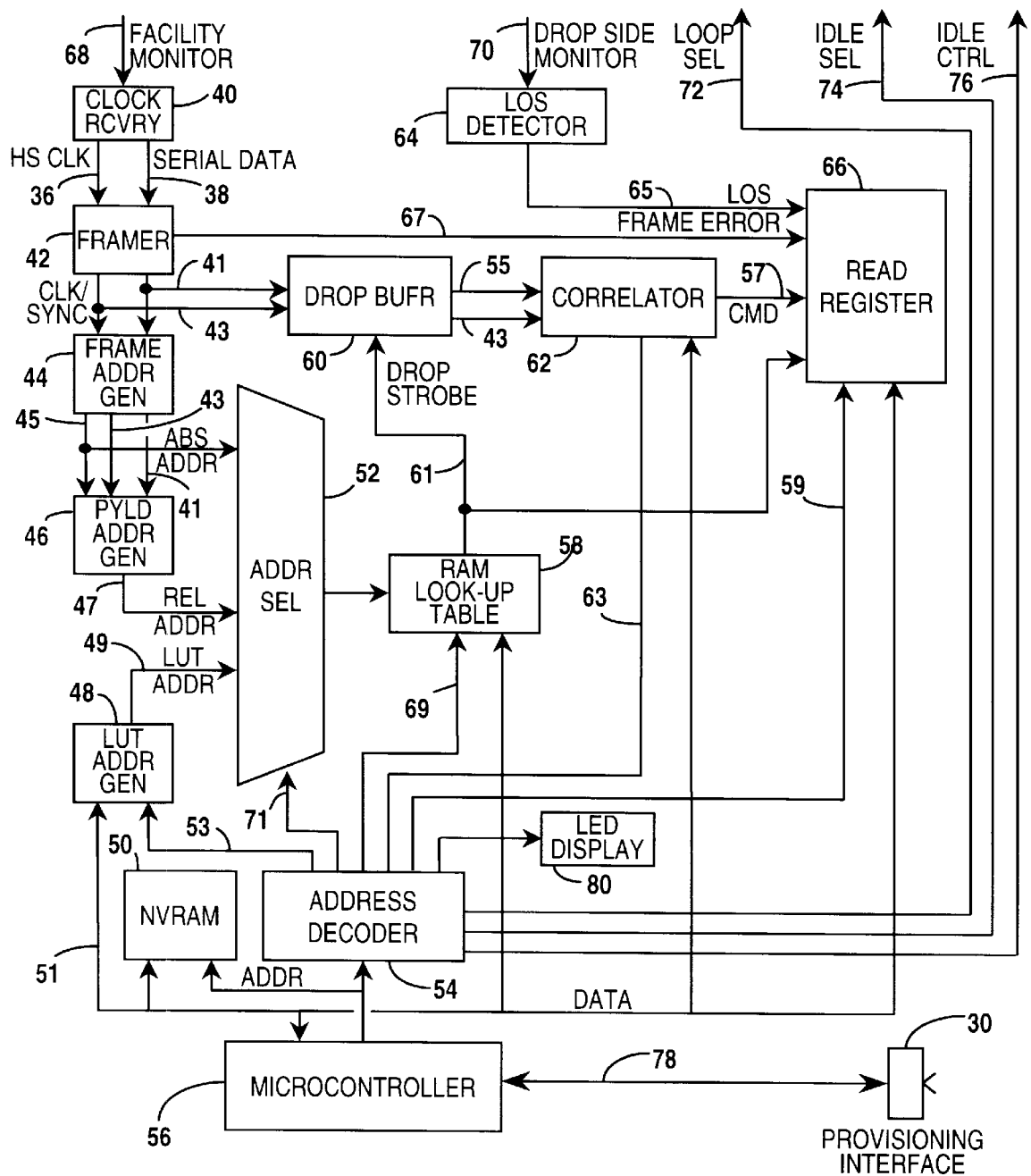
FIG. 2 shows a block diagram of the Command Logic Assembly.

Command logic assembly 10 is illustrated in FIG. 2. Facility monitor signal 68 passes through a clock recovery module 40 to generate a phase aligned high speed clock signal 36 and a clean bit serial data signal 38. Clock signal 36 and serial data 38 are connected to a framer module 42.

Framer module 42 aligns the SONET frame, descrambles the data, performs bit serial to parallel conversion, and generates a byte parallel frame data signal 41 and a clock and synchronization signal 43. Parallel frame data signal 41 and clock and synchronization signal 43 are connected to a drop buffer 60, a frame address generator 44 and a payload address generator 46.

If framer module 42 is unable to align the SONET frame, a frame error signal 67 is asserted. Frame error signal 67 is connected to a read register 66. A microcontroller 56 examines the contents of read register 66 on a periodic basis via a microcontroller data bus 51 and a read strobe 59 generated by an address decoder 54.

Frame address generator 44 tracks clock and synchronization signal 43 to generate an absolute frame address data output 45 corresponding to the interleaved SPE number, the row, and the column of the byte parallel data. Absolute frame address data output 45 is connected to an address selector 52 and payload address generator 46. Frame address generator 44 also forwards parallel frame data signal 41 and clock and synchronization signals 43 to payload address generator 46.

Payload address generator 46 extracts the SONET H1 and H2 payload pointers from parallel frame data signal 41 and generates a payload relative address data output 47 corresponding to the interleaved SPE number, the row, and the column of the byte parallel data in the payload. Payload relative address data output 47 is connected to address selector 52.

Address selector 52 is used to route either absolute frame address 45 or payload relative address 47 to a RAM Look-up Table 58. RAM Look-Up Table 58 asserts or clears a drop strobe signal 61 using a binary values stored in a linear look-up table. Entries in the stored look-up table correspond to the address applied to the input of RAM Look-up Table 58. Drop strobe signal 61 causes drop buffer 60 to extract the desired overhead byte(s) from parallel frame data signal 41 and forward said desired overhead byte(s) to a correlator 62 via a parallel drop data signal 55. Drop buffer 60 also forwards clock and synchronization signals 43 to correlator 62.

Absolute frame address 45 is used for byte locations in the transport overhead of the SONET frame. Payload relative address 47 is used for byte locations in the path overhead of the SONET frame. Microcontroller 56 is used to select the appropriate address input via address decoder 54 based upon the user configuration of the byte location(s) containing the embedded loopback command codes.

Microcontroller 56 is also used to program the look-up table stored in RAM look-up table 58 via a LUT address generator 48. Microcontroller 56 asserts the appropriate address select strobe 71 via address decoder 54 to set address selector 52 to route the output of LUT address generator 48 to the input of RAM look-up table 58. Microcontroller 56 then loads LUT address generator 48 with a valid address using microcontroller data bus 51 and a LUT write strobe 53 generated by address decoder 54. Microcontroller 56 then sets or clears corresponding look-up table entries stored in RAM lookup table 58 using microcontroller data bus 51 and a RAM write strobe 69 generated by address decoder 54. Microcontroller 56 confirms the write operation via read register 66 which is connected to drop strobe 61.

Correlator 60 performs a comparison of parallel drop data 55 from drop buffer 60 against the user specified values for embedded command codes. Microcontroller 56 is used to program correlator 60 with the user specified values for embedded command codes via microcontroller data bus 51 and a Correlator write strobe 63 generated by address decoder 54.

If a command code match is detected by correlator 60, a signal indicating the type of command code detected is sent to read register 66 via a command detect signal 57. Microcontroller 56 examines the contents of read register 66 on a periodic basis via microcontroller data bus 51 and read strobe 59 generated by address decoder 54.

If the on-state command code is detected, microcontroller 56 will assert loop select signal 72 via address decoder 54. If the off-state command code is detected, microcontroller 56 will clear loop select signal 72.

If the timer-state command code is detected, microcontroller 56 will assert loop select signal 72 via address decoder 54 for a fixed interval of time. Upon expiration of the fixed interval of time, microcontroller 56 will clear loop select signal 72. If the timer-state command code is detected before the fixed interval of time has expired, the fixed interval timer is reset and the interval begins again.

A provisioning interface 30 is connected via a provisioning data signal 78 to microcontroller 56 and is used to configure the location and characteristics of the loopback command codes. Using a simple ASCII command language, the user may enable and configure the location of the loopback command codes to be anywhere within the SONET Section, Line, or Path signal structure. The user may also configure the size of the command codes in bytes, their respective values, the number of times and the time interval within which a command code must appear to be considered valid. Microcontroller 56 stores the command code configuration information in a nonvolatile RAM (NVRAM) device 50.

Drop side monitor signal 70 is connected to LOS detector 64. LOS detector 64 evaluates drop side monitor signal 70 to determine if a signal is present. If no signal can be detected, LOS detector 64 asserts a LOS signal 65 connected to read register 66 to indicate an LOS state. Microcontroller 56 examines the contents of read register 56 on a periodic basis via microcontroller data bus 51 and read strobe 59. If an LOS state is detected, microcontroller 56 will assert idle select signal 74.

Provisioning interface 30 connected to microcontroller 56 is used to enable operation of idle signal generator 16 and configure said idle signal generator 16 path trace messages via an idle signal control 76.

A Light Emitting Diode (LED) display 80 is used to provide a visual indication of various states or conditions that may exist within the device. Microcontroller 56 controls LED display 80 via address decoder 54.

Figure 3:
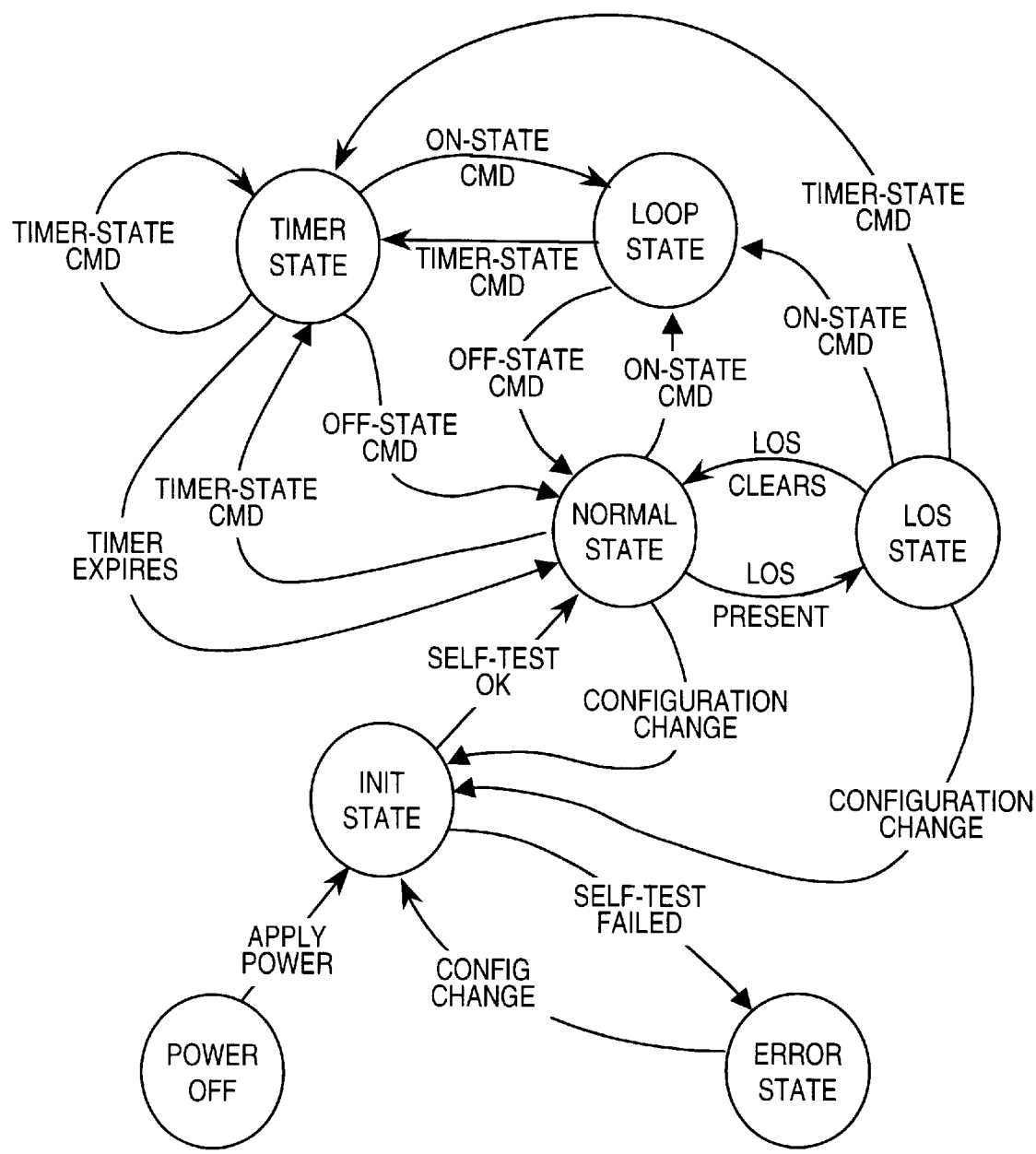
FIG. 3 shows an operational state diagram of the Remote SONET/SDH Loopback.

FIG. 3 illustrates an operational state diagram for the Remote SONET/SDH Loopback device. Refer to the following discussion for an explanation of the various operational states of the device.

In the Power off state the device will pass the SONET signal between facility and drop side if passive optical components are used for facility interface 24, drop side interface 26, facility receive signal splitter 12, drop side receive signal splitter 18, and switching circuit assembly 22. If active optical/electrical components are used the device will not pass the SONET signal. When power is applied to the device it will enter the Initialization state.

In the initialization state the device performs a self-test program and verifies the integrity of the stored configuration data. If the self-test program fails the device enters an error state. If the self-test program passes the device enters a normal state.

In the error state no further state changes are allowed until the configuration data is updated at which time the device will reenter the initialization state.

In the normal state the SONET signal passes through the device and the device monitors the SONET signal for command codes and loss of signal conditions as described above. If a loss of signal is present on the drop side signal the device will enter the LOS state. If an on-state command is received the device will enter the Loop state. If a timer-state command is received the device will enter the Timer state.

In LOS state the device generates an idle signal for transmission on the facility side. If a configuration change occurs, the device will reenter the initialization state. If an on-state command is received the device will enter the Loop state. If a timer-state command is received the device will enter the Timer state. The device otherwise remains in the LOS state until the loss of signal condition clears at which time the device will return the normal state.

In the Loop state the facility and drop side signals are looped back. No configuration changes are accepted by the device while in the Loop state. If an off-state command is received the device will return to the normal state. If a timer-state command is received the device will enter the Timer state.

In the Timer state the facility and drop side signals are looped back. No configuration changes are accepted by the device while in the Timer state. If an off-state command is received the device will return to the normal state. If a timer-state command is received the device will reenter the Timer state and the timed interval will be reset. If the timed interval expires the device will return to the normal state. If an on-state command is received the device will enter the Loop state and the timer expiration will be ignored.

A typical embodiment of the device will be suitable for rack mounting in an EIA standard equipment rack occupying only 1.75 inches of vertical rack space. Other variations of the unit include but are not limited to: shelf mount configurations, wall mount configurations, and sealed enclosures for outdoor or industrial use.

SUMMARY, RAMIFICATIONS, AND SCOPE

Accordingly, the reader will see that the Remote SONET/SDH Loopback improves upon any method or device currently in use today for terminating non-critical, non-secure, or inactive SONET network segments. The Remote SONET/SDH Loopback permits SONET service providers to:

Manage customer premise demarcation points effectively with automatic diagnostic capabilities;

Isolate network loss-of-signal faults without requiring a fully compliant SONET section terminating device;

Provide fiber optic mode conversion at the demarcation point.

Although the description above contains many specificities, these should not be construed as limiting the scope of the invention but as merely providing illustrations of some of the preferred embodiments of the invention. For example, the Remote SONET/SDH Loopback can be repackaged for operation in a multi-unit shelf mount configuration or an outdoor environmentally protected configuration; the optical interfaces on either drop or facility sides of the device may be replaced with optical or electrical interfaces varying in power, wavelength, or physical termination, etc.; the SONET rate of the optical signal may be varied to any standard SONET OC-N rate, where N is an integer from 1 to 96; the drop side signal detection may be optionally removed; the device may be used in critical or secure applications as conditions warrant.

Thus the scope of the invention should be determined by the appended claims and their legal equivalents, rather than by the examples given.

I claim:

1. An optical network interface device comprising:
   (a) a facility interface for transmitting and receiving a synchronous optical network communications signal,
   (b) a drop side interface for transmitting and receiving a synchronous optical network communications signal,
   (c) a facility signal splitter operatively connected to said facility interface receive signal,
   (d) a drop side signal splitter operatively connected to said drop side interface receive signal,
   (e) a switching circuit assembly operatively connected to said facility interface and said drop side interface,
   (f) an idle signal generator operatively connected to said switching circuit assembly,
   (g) a command logic assembly operatively connected to said switching circuit assembly.

2. An optical communications network interface device as set forth in claim 1, wherein said command logic assembly contains a means for controlling said switching circuit assembly to operatively connect said facility interface receive signal to said facility interface transmit signal upon receipt of a command string embedded within said facility interface receive signal.

3. An optical communications network interface device as set forth in claim 1, wherein said command logic assembly contains a means for controlling said switching circuit assembly to operatively connect said idle signal generator to said facility interface transmit signal upon detecting a loss of signal at said drop side interface.

* * * * *